United States Patent Office 3,251,520
Patented May 17, 1966

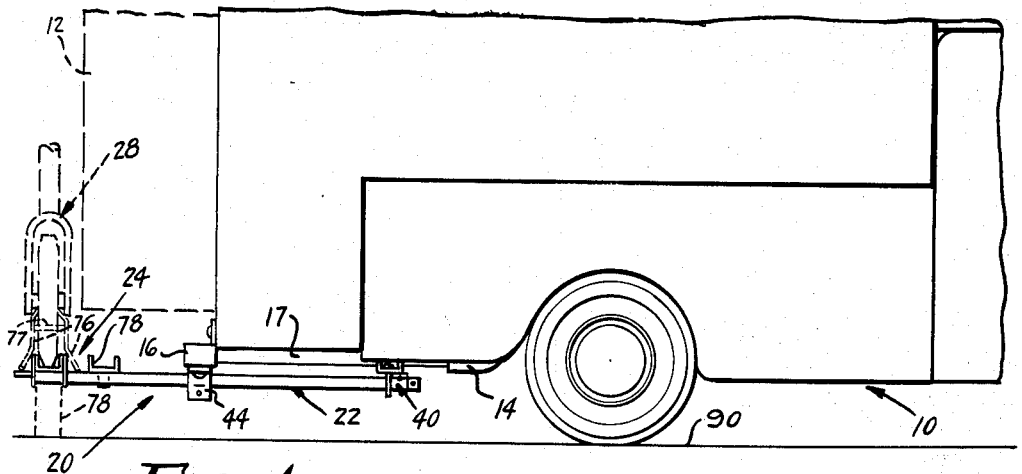
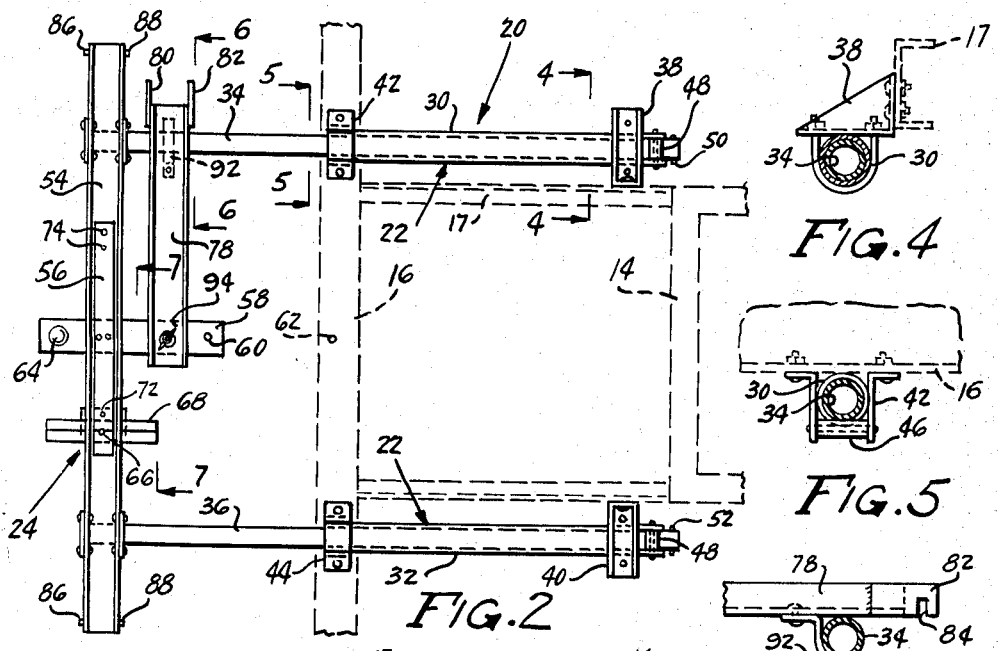
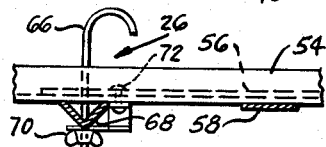

3,251,520
ROLLOUT CARRIER
William E. Van Dyke, 4005 Van Buren Blvd., and Otis C. Balthrope, 5646 Wohlstetter St., both of Riverside, Calif.
Filed Apr. 23, 1964, Ser. No. 362,043
8 Claims. (Cl. 224—42.03)

This invention relates to a rollout carrier for trail bikes and more particularly to a device for carrying a two-wheeled vehicle such as a motorcycle or bicycle on the rear of a camper-truck, truck mounted trailer or the like having an outwardly opening rear door which allows for a telescopic movement whereby the vehicle may be carried in juxtaposition to the rear of the same during transportation, and has as its primary object the provision of such a device which may be readily spaced from the rear of the same sufficiently to allow the rear door to be opened when the camper-truck, truck mounted trailer or the like is maintained stationary.

A further object of this invention is the provision of a device of the type described which is sturdy and durable in construction, reliable and efficient in operation, and relatively simple and inexpensive to manufacture, assemble, utilize, and maintain.

Another object of this invention is to provide a rollout carrier for trail bikes which may be easily taken apart by merely unfastening two bolts.

A further object of this invention is to provide a device for carrying a two-wheeled vehicle which includes removable ramp means to facilitate moving the vehicle onto the device.

A still further object of the instant invention is the provision of such a device wherein the vehicle may be placed thereon from either side of the device with slight modification of the parts.

Other and further objects reside in the combination of elements, arrangements of parts, and features of construction.

Still other objects will in part be obvious and in part be pointed out as the description of the invention proceeds and as shown in the accompanying drawing wherein:

FIGURE 1 is a side elevational view of a camper-truck, truck mounted trailer or the like associated with the rollout carrier of the instant invention, portions of a trail bike supported thereon being shown in dotted lines, the carrier being in its expanded position to allow opening of the rear door as shown in dotted lines;

FIGURE 2 is a top plan view of the carrier in its expanded position, the bumper and bumper channels connected to the chassis of the truck being shown in dotted lines;

FIGURE 3 is a side elevational view of the carrier;

FIGURE 4 is an enlarged fragmentary cross-sectional view taken substantially on line 4—4 of FIGURE 2;

FIGURE 5 is an enlarged fragmentary cross-sectional view taken substantially on line 5—5 of FIGURE 2;

FIGURE 6 is an enlarged fragmentary transverse cross-sectional view taken substantially on line 6—6 of FIGURE 2; and FIGURE 7 is an enlarged fragmentary transverse cross-sectional view taken substantially on line 7—7 of FIGURE 2.

Similar reference characters refer to similar parts throughout the several views of the drawing.

Referring now to the drawing in general and more particularly to FIGURE 1, a conventional camper-truck, truck mounted trailer or the like is designated generally by the reference numeral 10 and includes a hingedly secured rear door 12 shown in dotted lines in its opened position, the under carriage or chassis of the camper-truck, truck mounted trailer or the like 10 being shown schematically at 14 the rear bumper being designated at 16, and the bumper channels being shown at 17.

The device of the instant invention is designated generally by the reference numeral 20 and comprises basically a telescoping frame means 22 having one end fixedly secured to the bumper and channels 17 and carrying at its other end a vehicle support means 24 with means 26 for removably attaching a vehicle 28 thereto.

The telescoping frame means includes a pair of laterally spaced outer frame members 30, 32 slidably receiving inner frame members 34, 36. Brackets 38, 40 fixedly secure one end of the outer frame members 30, 32 to the channels 17 of the camper-truck, truck mounted trailer or the like 10 and brackets 42, 44 fixedly secure the other end of the outer frame members 30, 32 to the bumper 16 of the same in any conventional manner. Rollers 46, 48 are carried by the outer frame members 30, 32 and by the brackets 42, 44 to facilitate sliding movement between the inner and outer frame members. Stop means in the form of bolts 50, 52 are carried by the inner frame members 34, 36 and normally limit the movement of the inner frame members with respect to the outer frame members, the bolts 50, 52 being removable to allow selective disengagement of the inner and outer frame members.

The vehicle support means 24 includes a transverse channel member 54 extending between and secured to the inner frame members 34, 36 in any conventional manner. A reinforcing plate 56 is fixed centrally of the channel member 54 and a central frame member 58 is secured to the channel member 54 and the reinforcing plate 56 in any conventional manner and includes an aperture 60 at one end comating with an aperture 62 in the camper-truck, truck mounted trailer or the like bumper 16 when the telescoping frame means 22 are contracted in a manner, and for a purpose to be described in more detail hereinafter, a conventional ball hitch 64 being carried by the other end of the central frame member 58 for carrying any desired means behind the camper-truck, truck mounted trailer or the like 10.

The vehicle securing means 26 includes a substantially J-shaped bolt member 66 which is engageable through the kickstand of the vehicle 28 and which passes through the channel member 54 and a V-shaped kickstand support means 68 carried thereby to be selectively secured by a wing nut 70. The kickstand support means 68 is removably carried by the channel member 54 by bolt means 72 or the like, apertures 74 being provided for an alternate positioning of the kickstand support means 68. The V-shaped element supportingly receives the end of a conventional pivotally mounted kickstand 76 when the vehicle 28 is carried by the channel member 54.

A ramp means 78 in the form of a channel member having a pair of oppositely disposed lug members 80, 82 with recessed portions 84, is pivotally secured to oppositely disposed pin members 86, 88 carried by each end of the channel member 54 whereby, when in use, the ramp means 78 has one end adjacent an end of the channel member 54 and an opposite end in engagement with the ground 90. During transportation, the ramp means is removably carried by the telescoping frame means 22 and the central frame member 58, an arcuate resilient bracket 92 being carried by the ramp means 78 adjacent one end of the same for engagement over one of the inner frame members and a removable bolt means 94 being carried by the other end of the ramp means 78 for securing the same to the central frame member 58.

The use and operation of the device of the instant invention will now be apparent. The outer frame members 30, 32 are secured to the channels 17 and rear bumper 16 of the camper-truck, truck mounted trailer or the like 10 by the bracket 38, 40 and 42, 44 respectively. The inner frame members 34, 36 of the telescoping frame means 22 are slidably received within the outer frame members 30, 32 and stop means 50, 52 are operatively secured to one end of the same to preclude disengagement of the outer and inner frame members. The telescoping frame means can be expanded to a stationary position as shown in the drawings wherein the ramp means 78 is secured to either end of the same by engaging the recessed portions 84 of the lugs 80, 82 over one pair of pins 86, 88. A two wheeled vehicle 28 to be carried is then pushed up the ramp means 78 onto the channel member 54. The two wheeled vehicle 28 is provided with a conventional A-frame type kickstand 76 which engages in the V-shaped member 68. Kickstand 76 is provided with the usual cross bar 77 over which J-bolt 66 is engaged and the wing nut 70 is tightened to securely hold the vehicle 28 in position. With the telescoping frame means 22 expanded as shown, the rear door 12 of the camper-truck, truck mounted trailer or the like 10 can be readily opened or closed. When it is desired to transport the vehicle 28, the telescoping frame means 22 is contracted and a bolt means or the like engaged through the apertures 60, 62 to lock the same in a position with the vehicle 28 juxtaposed to the rear of the camper-truck, truck mounted trailer or the like 10. The ramp means 78 is secured by resilient bracket 92 and bolt means 94 to the carrier for transportation. The major components of the carrier 20 may be readily removed by disengaging the stop means 50, 52 and withdrawing the inner frame members 34, 36 from the outer frame members 30, 32. This would be done whenever the device is to be stored or when maintenance of the trailer requires an unencumbered rear area.

It will now be seen that there is herein provided an improved rollout carrier for trail bikes or the like which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. In combination with a first vehicle having a body having an underside and an open rearward end, outwardly opening rearwardly facing substantially vertical closure means for said open rearward end; a two wheeled vehicle and a device for carrying said two wheeled vehicle rearwardly of said first vehicle, said device comprising at least two outer frame members secured in parallel relation to said underside of said first vehicle body; an inner frame member telescopically slidably mounted in, and extending through each of said outer frame members providing a forward and rearward end; releasable means on said forward end of said inner frame member for engaging said outer member thereby precluding the inadvertent separation of said inner and outer frame members; an upwardly facing U-shaped channel member secured to said rearward ends of said inner frame members; and means on said channel member for releasably engaging said two wheeled vehicle, said two wheeled vehicle including an A type kickstand and said engaging means comprising an inverted J-shaped bolt extending through said transverse support member for engaging the cross bar of said A type kickstand.

2. The structure of claim 1 including an upwardly facing downwardly inclined U-shaped ramp means secured to one end of said U-shaped channel member.

3. The structure of claim 2 wherein said ramp means is releasably pivotally secured to said U-shaped channel member.

4. The structure of claim 3 including means on said inner frame adjacent said channel member for releasably carrying said ramp means.

5. A device for carrying a bulky article rearwardly of a vehicle having an outwardly opening rearwardly facing closure means comprising telescoping frame means comprising at least two outer parallel frame members fixedly secured to said vehicle adjacent the rear thereof and an inner frame member slidably mounted in each of said outer frame members, said inner frame members extending beyond the rear end of said vehicle; at least one rollable bearing means on said frame means mounted on one of said frame members in rolling engagement with the other of said frame members for facilitating the telescoping thereof; a transverse support means fixedly secured to the exposed ends of said inner member; attachment means on said transverse support means for releasably engaging a bulky article; and means on said transverse support means for releasably engaging the rear end of said vehicle, said engagement means including a central frame member secured to said transverse support means and extending between said inner frame members and means for releasably securing said central frame member to said rearward end of said vehicle, and said attachment means including a V-shaped channel member secured to the underside of said transverse support means with the apex of said V-shaped member pointing downwardly, said V-shaped member extending outwardly of said transverse support means.

6. The structure of claim 5 wherein said attachment means further includes an inverted J-shaped bolt extending through said transverse support member for engaging the cross piece of an A-frame of a kickstand of a two wheeled vehicle.

7. The structure of claim 5 wherein one of said transverse rollers is mounted on the rearward end of said outer frame member in engagement with said inner frame member and another of said transverse rollers is mounted on the forward end of said outer frame member in engagement with said inner frame member.

8. The structure of claim 7 wherein said rearward transverse roller is positioned over said inner frame member and said forward transverse roller is positioned under said inner frame member.

References Cited by the Examiner

UNITED STATES PATENTS

| | | | |
|---|---|---|---|
| 2,346,605 | 4/1944 | Proudfoot | 214—85.1 |
| 2,431,400 | 11/1947 | Iverson. | |
| 2,525,977 | 5/1951 | Klotz. | |
| 3,039,634 | 6/1962 | Hobson | 224—42.03 |
| 3,176,903 | 4/1965 | Farley | 224—42.03 |

FOREIGN PATENTS 494,674 10/1938 Great Britain.

GERALD M. FORLENZA, *Primary Examiner.*

HUGO O. SCHULZ, *Examiner.*

J. E. OLDS, *Assistant Examiner.*